O. E. STEVENS.
AUTOMATIC BLOCK SIGNALING SYSTEM FOR ELECTRIC RAILWAYS.
APPLICATION FILED JUNE 26, 1908.
1,163,182.
Patented Dec. 7, 1915.
4 SHEETS—SHEET 1.
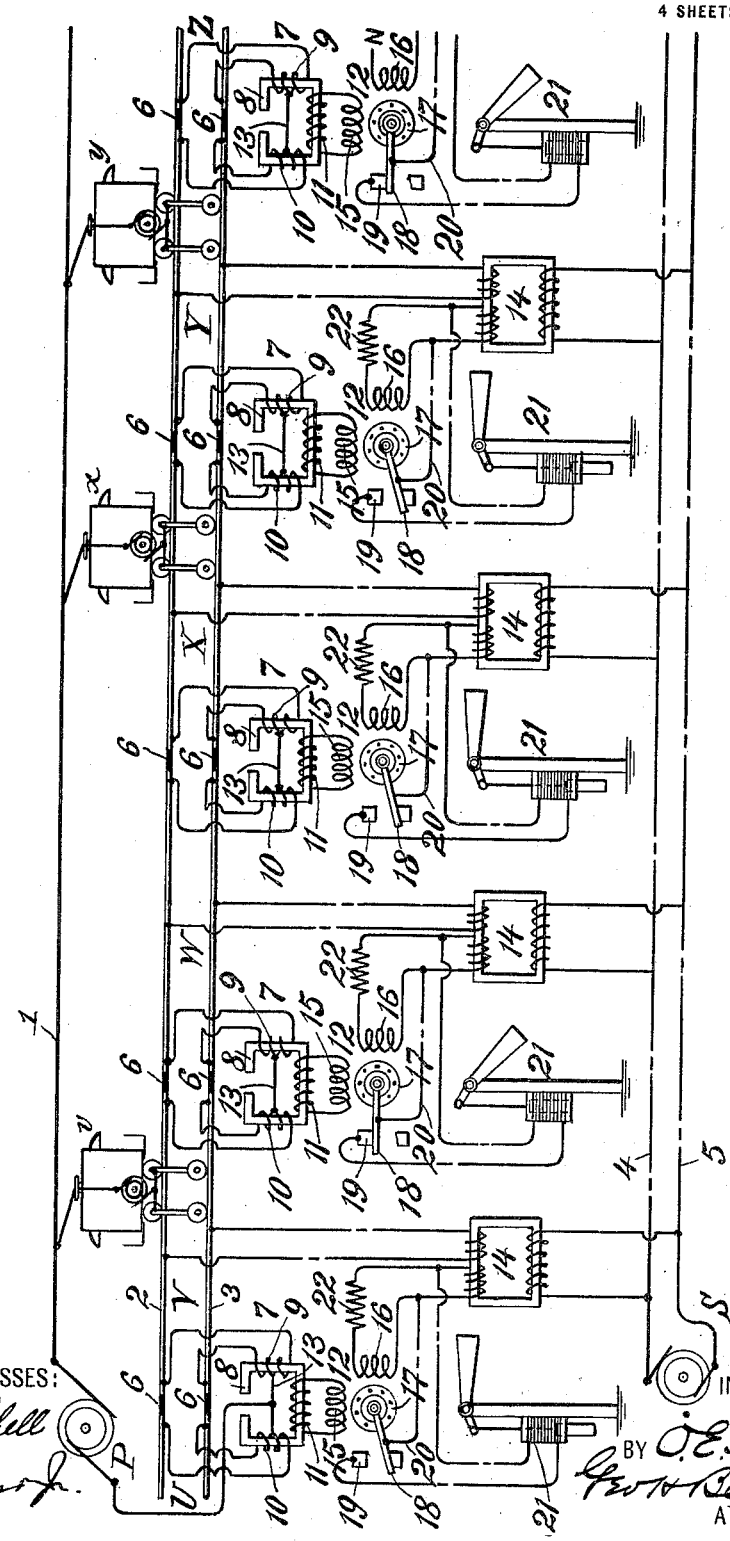

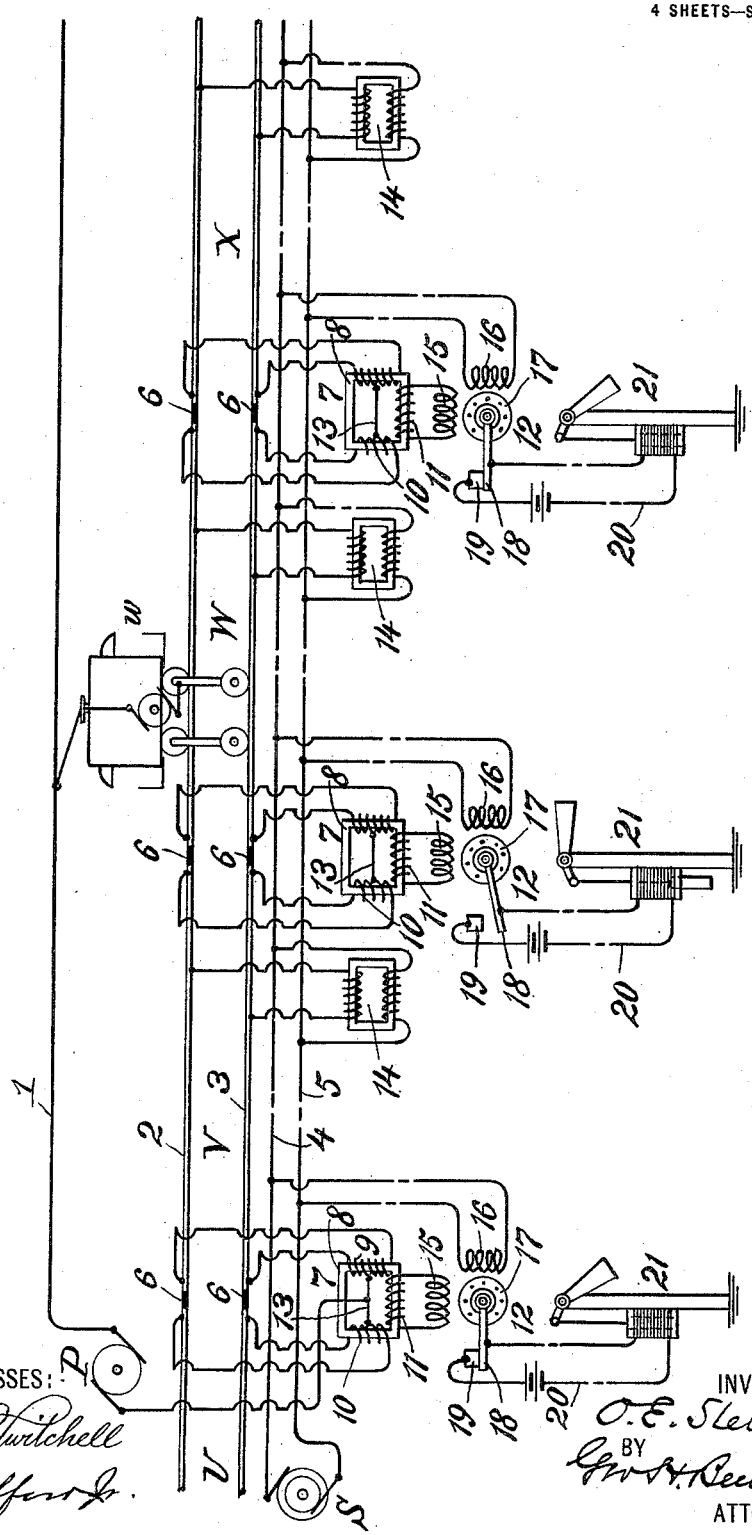

O. E. STEVENS.
AUTOMATIC BLOCK SIGNALING SYSTEM FOR ELECTRIC RAILWAYS.
APPLICATION FILED JUNE 26, 1908.
1,163,182.
Patented Dec. 7, 1915.
4 SHEETS—SHEET 3.
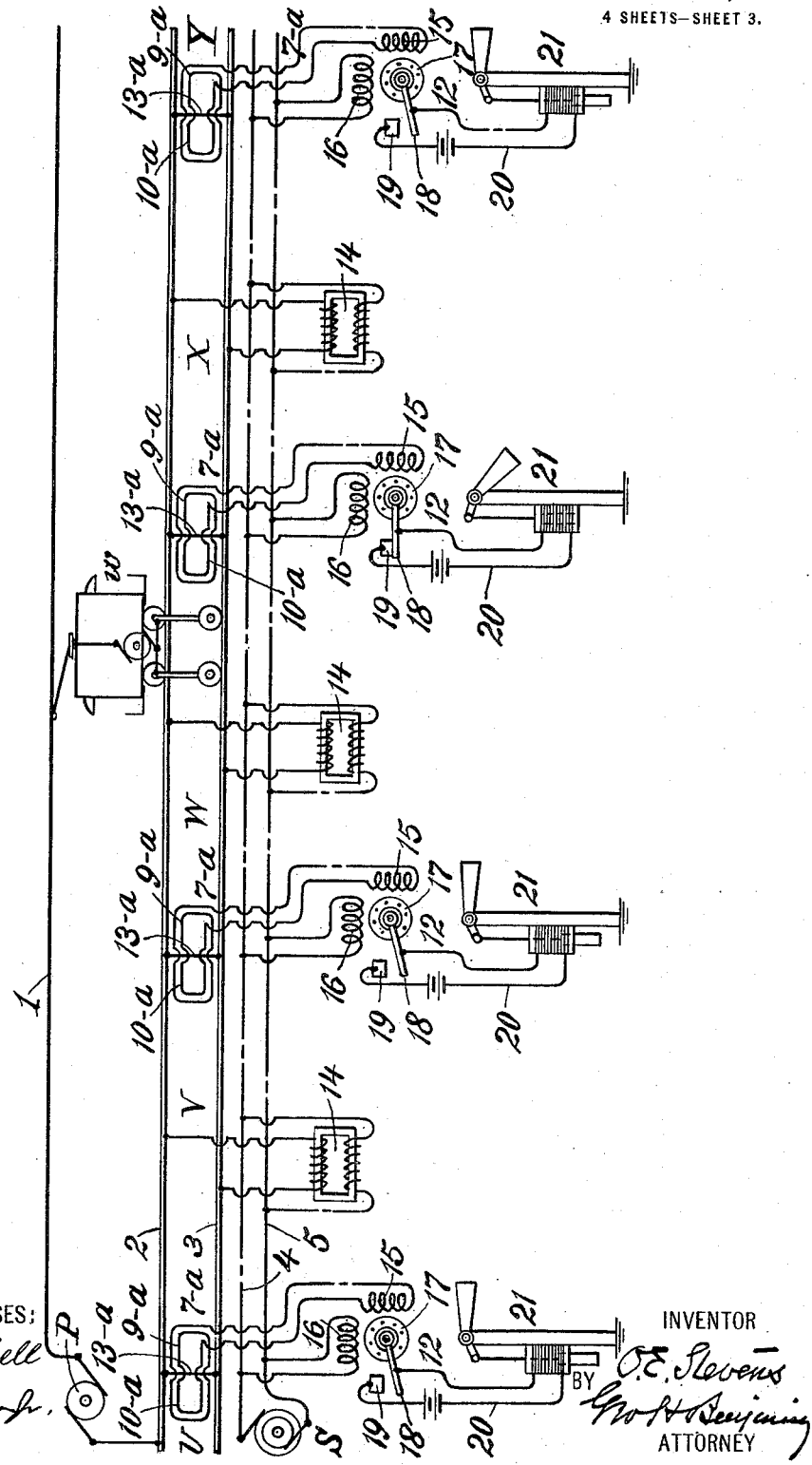

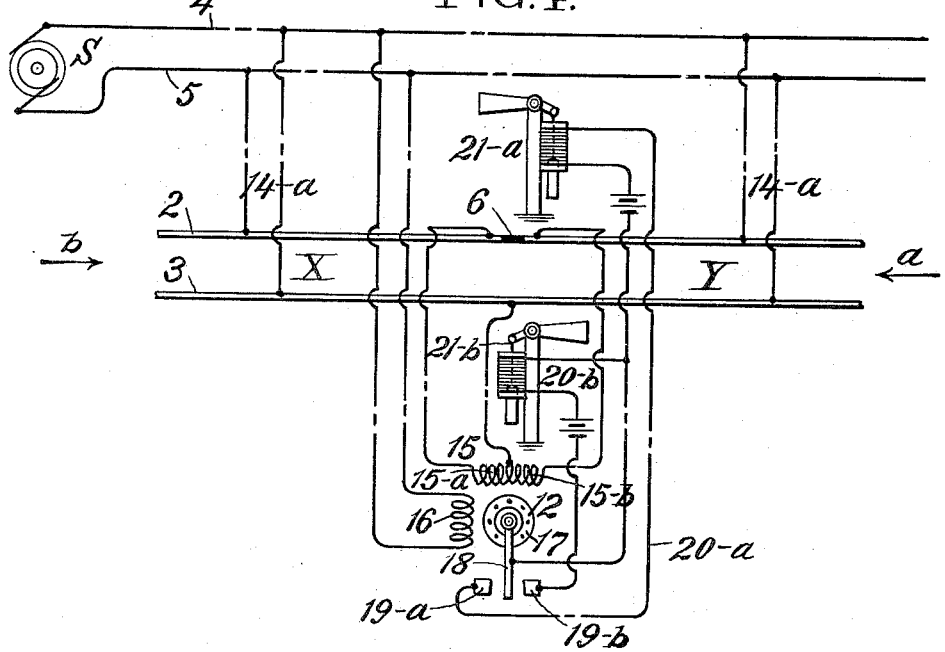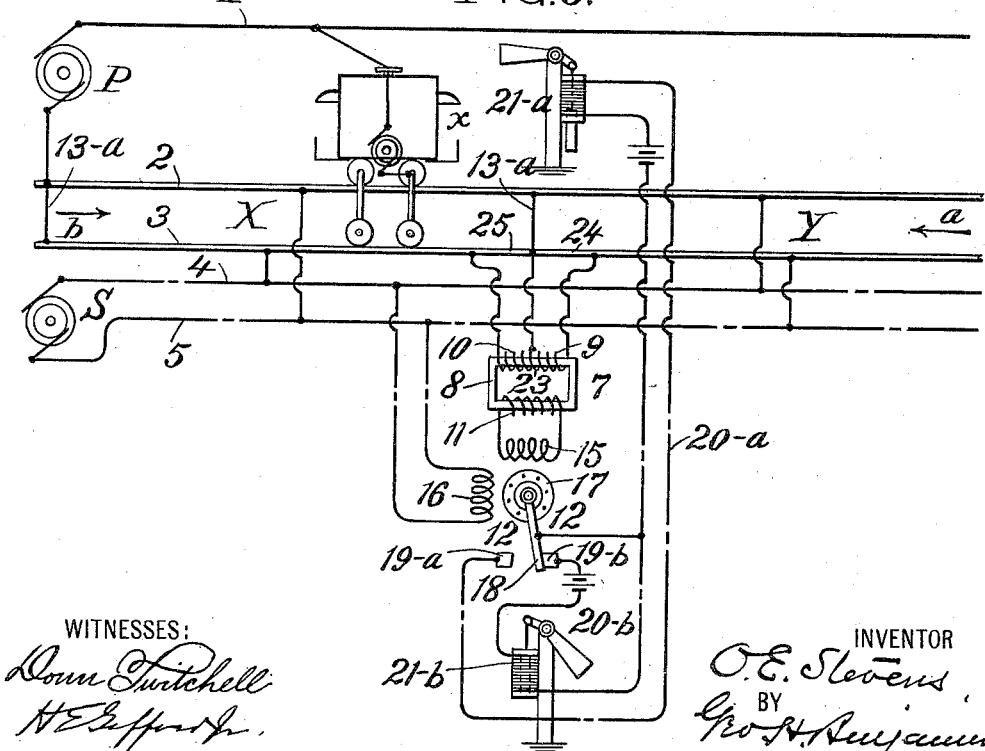

UNITED STATES PATENT OFFICE.

OSCAR EGERTON STEVENS, OF NEW YORK, N. Y., ASSIGNOR TO GENERAL RAILWAY SIGNAL COMPANY, A CORPORATION OF NEW YORK.

AUTOMATIC BLOCK-SIGNALING SYSTEM FOR ELECTRIC RAILWAYS.

1,163,182.   Specification of Letters Patent.   Patented Dec. 7, 1915.

Application filed June 26, 1908. Serial No. 440,428.

*To all whom it may concern:*

Be it known that I, OSCAR EGERTON STEVENS, a citizen of the United States, residing at New York city, county and State of New York, have invented certain new and useful Improvements in Automatic Block-Signaling Systems for Electric Railways, of which the following is a specification.

My invention relates to that type of automatic block signaling systems wherein the track rails separately serve as return paths for the power current to the power generator; are divided into block sections, and the signaling devices therein are automatically controlled by the movement of the motor vehicles into and out of the block sections.

Heretofore it has been the practice to energize the signal controlling device employed, by a difference of signaling current potential impressed upon the block section in which the controlling device was located. My invention differs therefrom in that— first, the signal controlling devices of the system are normally deënergized, except in a normal "clear" system; second, the signal controlling devices of the system are normally controlled by the signaling current impressed upon adjacent block sections; third, the signal controlling devices may be individually arranged to control a plurality of signals. There are also other features of difference which will be apparent to those skilled in the art from the specification and claims.

The objects of my invention are to generally improve automatic systems of block signaling by increasing the safety factor and by decreasing the cost of installation and operation, the first condition being obtained by the fact that positive movement is imparted to the signal controlling device in opposite directions, instead of depending upon the action of a weight, or spring for movement in one direction as is usual, and the latter condition by providing that the signal controlling device may be normally deënergized, thereby decreasing the cost of the signaling power apparatus and providing that the signaling current consumed shall be in accordance with the traffic.

My improved system is applicable for use on electric railways or steam railways.

The accompanying diagrams will illustrate the various embodiments of my invention.

Figure 1 is a diagram of a normal "danger" system. Fig. 2 is a diagram of a normal "clear" system. Fig. 3 is a diagram of a normal "danger" system, but showing the trackway continuous and the signal controlling devices arranged in inductive relation with the track rails. Figs. 4 and 5 show modifications of my system as applied respectively to a steam railway and an electric railway, with a plurality of signals controlled by a single signal controlling device.

I wish it understood that the diagrams are merely illustrations of certain arrangements which may be made embodying my invention, and that in practice very many other arrangements may be made, having in mind the employment of devices such as bonds, inductive and otherwise, phase controlling devices, relays, cross-connections between parallel track rails, &c., such as are now well known to signaling engineers.

Referring now to the several figures: In Fig. 1, P is a source of power current fed to the motor vehicles $v$, $x$, $y$, etc., by the conductor 1 and returning thence to the source of power P by the rails 2, 3. This power current may be either direct or alternating. S is a source of alternating signaling current and is fed to the block signaling devices by the conductors 4, 5. The rails 2, 3 are divided into block sections U, V, W, X, Y and Z by the insulations 6, 6, 6, etc. In order that the power current may return to the source of power P inductive devices 7 are connected to the rails 2, 3 of adjoining block sections. These inductive devices consist of an iron core 8 and three coils 9, 10, 11. Coil 9 is connected across the rails 2, 3 of one block and a coil 10 across the rails of an adjacent block. Coil 11 is connected to a relay device 12. The middle points of coils 9, 10 are connected together by the connector 13 so that the power current in the rails 2, 3 will flow in at the two ends of coil 9 and out at its middle point through the conductor 13 to the middle point of coil 10, and thence through the two halves of this coil 10 back to the rails, 2, 3, and so on to the source of power P. Preferably the coils 9, 10, 11 are in good inductive relation that is they are sandwiched or otherwise interposed. It will be seen that inasmuch as the power current flows in opposite directions in the two halves of the coils 9, 10 it will produce no magnetization in the magnetic core 8. 14, 14, 14, etc., are transformers whose primaries are connected across the source of signaling current, and whose secondaries are connected across the rails, in a well known manner. The secondaries of transformers 14 are connected oppositely in adjacent blocks, so that at the instant that rail 2 of block W is positive, rail 2 of block X is negative, etc. 12 is a relay of the polyphase inductive type with one winding 15 connected to coil 11 of inductive device 7, the other winding 16 is connected across the source of signaling current S. This relay has a rotor member 17 on which is an arm 18 which when the relay is energized in a certain way, makes contact with contact 19, and thus closes a local circuit 20 and operates the signal mechanism 21. 22 is either resistance or reactance placed in circuit with winding 16 for the purpose of decreasing the amount of energy and causing the current in winding 16 of relay device 12 to be displaced in phase with the current in winding 15 and thus cause a rotating field to produce a turning movement in rotor 17. The windings 15 and 16 of relay device 12 may be so designed that neither resistance nor reactance 22 will be required. Other types of polyphase translating devices may be substituted for relay 12.

The operation of my system as shown in Fig. 1 may be briefly described as follows: Normally, that is when no train is present, the relay devices 12 are deënergized, for the reason that the alternating electro-motive force of one block opposes that of the adjacent blocks in the coils 9, 10 for it will be noted that they are on the same magnetic core, and there is, therefore, no electro-motive force induced in winding 15 to operate the relay device 12. When a train, such as $v$, enters a block, it shunts the transformer 14, of that block and allows the transformer 14 of the block in the rear of the train to cause a flow of alternating current in coil 10 to set up an alternating magnetic flux in the core 8 and thus induce an E. M. F. in coil 11 to operate the relay device 12, to close a local circuit 20 and so actuate the signal to the "proceed" position. If, however, there is a train in the block in advance of the train in block X, such as $y$ in block Y, when train $x$ enters block X, the relay 12 will not be energized, for the reason that the transformers of blocks $x$ and $y$ are both shunted through the two trains and there is no E. M. F. induced in winding 15 of the relay device 12. When a train passes into a block it "shunts" the energy from coil 9 of the inductive device 7 behind it. This allows coil 10 to set up a magnetic flux in the magnetic core 8 and thus induce an E. M. F. in the relay member 15 to operate this relay, but inasmuch as this electro-motive force will be opposite in "polarity" from that induced in coil 15 when coil 9 actuates the relay it will open the relay and cause the signal to go to the "danger" or "stop" position behind a train.

It will be noted in the above described embodiment of my invention, that all the signal instrumentalities including the track circuits do not normally absorb electrical energy, and that the energy for operating the signals is only expended when the trains are present and in direct proportion to the number of trains that would be present upon a given line of railroad. This will obviously greatly decrease the cost of the operation of a system. This embodiment also increases the safety of operation by being a "normal danger" signaling system and one that is "normal danger" from the track circuits.

It is thus seen that where formerly a relay device has been actuated to the "danger" or open position by gravity or the tension of a spring, it is in this embodiment of my invention actuated to this position by electrical energy instead of, or in addition to, gravity or the tension of a spring. This fact does away with any possibility of the relay device "sticking" closed after the passage of a train into the preceding block, also should a broken rail or broken bond wire occur, the danger of a false signal is removed.

The transformers 14 should be of poor regulation so that when a train is in that part of the block that train $x$ is in block X the E. M. F. set up across the rails will drop to such a low value that there will be substantially no excitation of winding 15 by coil 9.

Referring to Fig. 2: This differs from Fig. 1 in that the signals are normally "clear". This is accomplished in this embodiment of my invention as follows: The E. M. F.'s, induced by coils, 9 and 10 of this inductive device 7, are so arranged and designed that they induce opposing electro-motive forces in winding 15 of relay device 12, but they are also so arranged and designed that these electro-motive forces, though opposite in effect on the relay 12 will not be equal in magnitude. This is accomplished in this diagram by making coil 9 of a greater number of turns than coil 10. Thus the E. M. F. induced in winding 15, by coil 9, is sufficiently greater than that induced in this winding by coil 10, that the relay is normally energized and the local circuit 20, is closed and the signal, therefore is normally in the "clear" or "proceed" position. When, however, a train, such as $w$, is in a block it "shunts" the energy from the transformer 14, of that block, so that there is no flow of current in coil 9; then the electro-motive force induced in winding 15, by coil 10, predominates and the relay is electrically energized to move to the open position and the signal goes to the stop position behind a train: this eliminates any danger of the relay devices, 12, from staying in the closed position after a train has passed into the block. Heretofore there has been danger of this occurring, as heretofore only gravity or the tension of a spring has been relied on to open the relay contact. There are obviously a great many ways to accomplish this result without departing from the meaning and intent of my invention which is, in this embodiment, to provide an efficient means for actuating the translating device by electrical energy to assume the open or danger position behind a train, and I claim to be the first to have shown how this could be done. The connection 13 between the coil 9 and 10 of inductive device 7 may be omitted if the embodiments of my invention illustrated by Figs. 1 and 2 are applied to railways in which the traffic rails are not used for the return of the car propulsion current.

Referring to Fig. 3: $7^a$ is a coil laid in inductive relation to the rails 2 and 3, substantially as shown. This coil has one part $9^a$, in inductive relation to the closed track circuit of one block and another part $10^a$, in inductive relation to the rails of an adjacent block. The rails are divided into block sections by the crossbonds, $13^a$. The operation of this embodiment of my invention is similar to that of Fig. 1, that is, normally the relay devices, 12, are deënergized and the signals are in the stop position. The electro-motive force induced in one part $9^a$, of the inductive coil $7^a$, by the current fed to one track circuit by the transformer 14, is neutralized in its effect on winding 15, of relay device 12, by the current induced in part $10^a$ of inductive coil $7^a$, by the current in an adjacent closed track circuit. When train W enters a block it shunts the current fed to that block by transformer 14 and allows the translating device behind it to be actuated to the open or "danger" position by the current induced in part $10^a$ of coil $7^a$, also, if the block in advance is unoccupied, the translating device governing the entrance to this block will be actuated to the closed or "clear" position by the current induced in part $9^a$, of coil $7^a$.

In Figs. 1, 2 and 3 I have shown the translating devices controlled oppositely by the electrical energy impressed on adjacent track circuits and inductive devices connected to or in inductive relation with adjacent track circuits for producing the opposite control in the translating devices. These inductive devices may be dispensed with and the opposite control obtained by connecting the translating devices to the rails in a manner similar to that shown in Fig. 4. In this Fig. 4 I have also shown a three position relay designed and connected directly to the track rails so that when energized by one track circuit alone it assumes one position and when energized by another track circuit alone it assumes another position opposite to the first, and when energized by both track circuits or when deënergized it assumes a neutral position intermediate the other two positions. Thus when a train enters block X going in the direction indicated by the arrow $b$, it will shunt the energy fed to this block section by conductors $14^a$ and part $15^a$ of the relay coil 15, will be deënergized and if block Y is unoccupied, this will allow part $15^b$, to energize the relay 12 in such a direction that the arm 18 will make contact with point $19^b$, thereby closing local circuit $20^b$, and energizing the semaphore $21^b$ to the "proceed" position. When this train leaves block X and enters block Y, it will "shunt" the energy fed to block Y from part $15^b$, thereby allowing part $15^a$, to be actuated in the opposite direction, and allow the signal $21^b$, to go to the "stop" position behind the train by gravity. If a train enters block Y going in the direction indicated by the arrow $a$, it will shunt the energy fed to this block by the conductors $14^a$, thereby allowing part $15^a$, to operate the relay so that contact arm 18 makes contact with point $19^a$, and energize the signal $21^a$ to the "proceed" position. If, however block X is occupied when a train enters block Y, all energy will be shunted from coil 15, and it will remain in the "neutral" position, as shown. When either of the blocks X or Y is occupied, the energy supplied to the coil $15^a$ is equal and opposite in its effect to the energy supplied to coil $15^b$. Relay device 12, is therefore, normally deënergized and both signals are normally at the "stop" position.

In the embodiment shown by Fig. 5 I have obtained the opposite effects in the relay by means of inductive device 7 which has two coils 23 and 11. Part 9 of coil 23 is connected across a given length of rail 24 of block Y. Part 10 of coil 23, is connected across a given length of rail 25 of block X. The other coil 11 is in inductive relation with windings 9 and 10 and is connected across member 15 of relay device 12. There will be differences of electrical potential set up across the windings 9 and 10 by the track circuit currents flowing through the impedance of the rail portions 24 and 25 respectively. These differences of potential are opposite in their effect on the relay device 12. The division of the rails in this figure is by bond $13^a$ which corresponds with bond 13 of Fig. 3. The operation of this embodiment relative to the movement of trains in and out of the blocks is similar in every respect to the operation of Fig. 4.

In Figs. 4 and 5, for the sake of clearness, the energy is shown fed to the block sections by direct connections to the sources of supply. It is obvious, however, that inductive devices could be employed intermediate the block sections and sources of supply.

I do not wish to limit myself to any types of relays translating or transforming devices, for any relay, translating or transforming device, known in the art, could be adapted to operate in my invention, nor do I wish to limit myself to any particular type of track circuit or reactance bonding between parallel rails or between adjacent block sections. I have only endeavored to show in these figures a few of the uses or embodiments of my invention. It will also be obvious that all the devices shown in these figures are inter-changeable, that is, the type of track circuits shown in any of the figures could be used in connection with the transforming or translating devices shown in any of the other figures.

Having thus described my invention, I claim:

1. A signaling system employing closed track circuits and normally deënergized relay devices operated in one direction by the energy in one closed track circuit and in another direction by the energy in another closed track circuit.

2. A signaling system for railways employing closed track circuits and normally deënergized relay devices operated in one direction by the energy in one closed track circuit and in another direction by the energy in another closed track circuit and signals controlled by said relay devices.

3. A signaling system employing closed track circuits and normally deënergized relay devices controlled in one direction by the energy in one closed track circuit and in another direction by the energy in another closed track circuit, and signals and local circuits controlled by said relay devices.

4. A signaling system for railways employing closed track circuits and normally deënergized relays, each of said relays comprising a stator member having two coils and a rotor member adapted to be rotated in one direction when the energy traversing one of said stator coils is in one direction and in the opposite direction when the energy traversing said coil is in the opposite direction, and signals controlled by said relay devices.

5. A signaling system employing closed track circuits of alternate polarity and normally deënergized relay devices, each of said relay devices comprising a stator member having two coils and a rotor member, and one of the coils of the stator member in inductive relation with two adjacent contiguous closed track circuits whereby when the current from one track circuit influences said coil the relay will be operated in one direction and whereby when the current from the other track circuit influences said coil the relay will be operated in the opposite direction, and signals controlled by said relay devices.

6. The combination in a signaling system of means for supplying alternating current of opposite potential to adjacent closed track circuits, normally deënergized relay devices operated in one direction by the energy from one closed track circuit and in the opposite direction by the energy from the other track circuit, and signals operated by said relay devices.

7. The combination in a signaling system of means for supplying alternating current of opposite polarity to adjacent closed track circuits, normally deënergized relay devices, signals controlled by said relay devices, and means interposed between two adjacent closed track circuits and the relay devices whereby when one closed track circuit is occupied the relay device will be operated in one direction, and when the other closed track circuit is occupied, in the other direction.

8. A signaling system comprising a source of power current, traffic rails which serve as returns for the power current, means for dividing the traffic rails into block sections which will permit flow of power current but confine the signaling current to the limits of a block section, a source of signaling current, means for impressing a signaling current upon each block section, and signal controlling devices normally deënergized but adapted to be actuated in one direction when the current from one block section flows through them and in the opposite direction when the current from the adjacent block section flows through them.

9. A signaling system for railways employing closed track circuits, normally deënergized relay devices, said relay devices actuated to the "clear" position when energized by the current from one closed track circuit and to the "danger" position when energized by the current from the adjacent closed track circuit.

10. A signaling system for railways employing closed track circuits, normally deënergized relay devices controlled by said track circuits, said relay devices being positively actuated by the current from one closed track circuit to the open or "danger" position, and positively actuated by the current from the other closed track circuit to the closed or "clear" position.

11. A block signaling system employing a coil in inductive relation to two track circuits, equal and opposite currents induced in said coil by the two track circuits and a signal controlled by said induced currents.

12. A block signaling system for railways employing closed track circuits, a coil in inductive relation to two adjacent track circuits, a normally deënergized relay controlled as to its direction of movement by the direction of current flowing in said coil in inductive relation to the track circuits, and a signal controlled by said relay.

13. A signaling system employing a block signal controlling device comprising two members, one fixed and the other movable, the fixed member consisting of two coils, one of said coils being a composite coil divided into three coils, two of which coils are connected across the rails of adjacent block sections of the system and these coils connected together at their middle points, the third coil in inductive relation to the other two, the said second coil of said fixed member connected across the source of signaling energy and the said movable member consisting of a closed circuited coil.

14. A block signaling system for railways employing a three coil transformer one coil connected to one block section another coil connected to another block section, and the third coil connected to a signal controlling device.

15. A translating device, a combined transformer and reactance bond comprising a magnetic core, three coils thereon, two of said coils being connected across the rails of adjacent block sections and the third coil connected across the translating device and a signal controlled by said translating device.

16. A bond comprising a core, two coils thereon and a connection between the middle points of each of said coils.

17. A bond comprising a single core having a magnetic circuit of high reluctance, two coils thereon and a connection between the middle points of said coils.

18. A bond comprising an open magnetic core, two coils thereon and a connection between the middle points of such coils.

19. In a block signaling system and in combination with the traffic rails, a balanced reactance bond having a single core constructed to freely permit the passage of the power current but prevent the passage of the signaling current from block to block, a relay device having a fixed member and a movable member, with one of the coils of the fixed member in inductive relation with the coils of said balanced bond, and its other coil connected across the source of signaling energy.

In testimony whereof, I affix my signature, in the presence of two witnesses.

OSCAR EGERTON STEVENS.

Witnesses:
H. E. GIFFORD, Jr.,
ELIZABETH BARNETT.

Copies of this patent may be obtained for five cents each, by addressing the "Commissioner of Patents, Washington, D. C."